G. G. HEGHINIAN.
CALCULATING MACHINE.
APPLICATION FILED NOV. 19, 1914.
1,234,758.
Patented July 31, 1917.
2 SHEETS—SHEET 1.
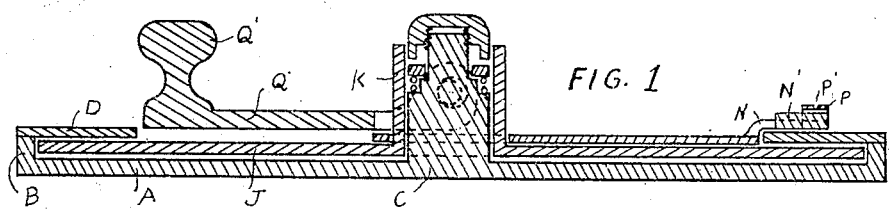
FIG. 1
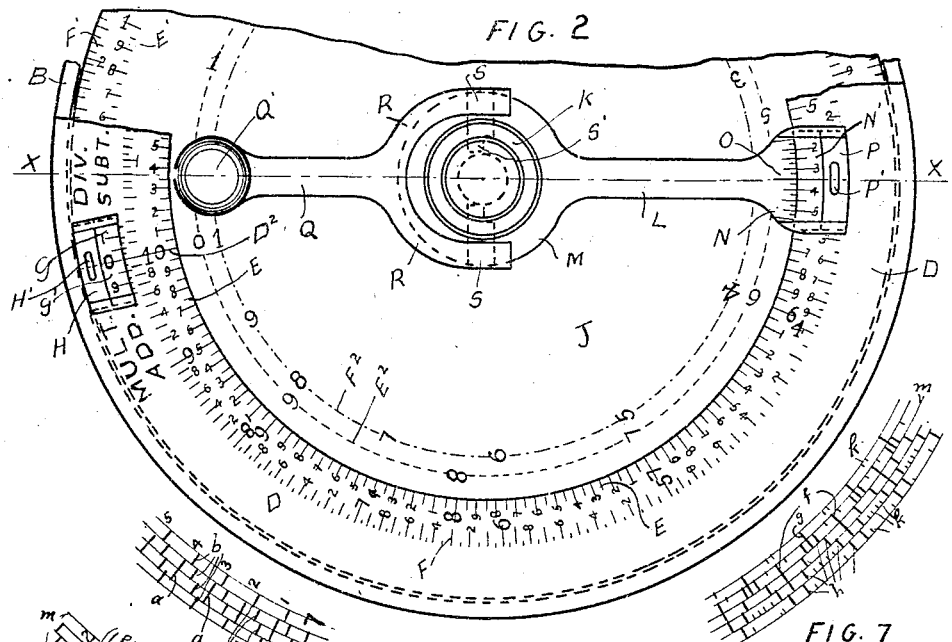
FIG. 2
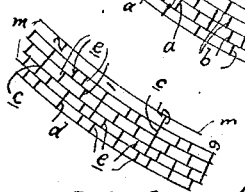
FIG. 5
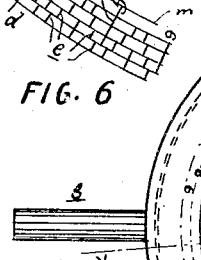
FIG. 6
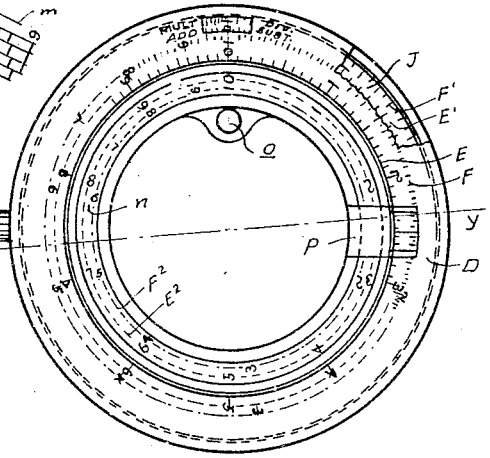
FIG. 3
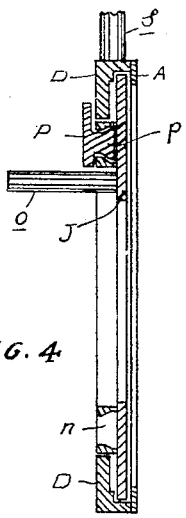
FIG. 7
FIG. 4
WITNESSES:
M. Shaw.
H. Gill.
INVENTOR.
G. G. Heghinian
BY
Sean F. Gurr
his ATTORNEY.

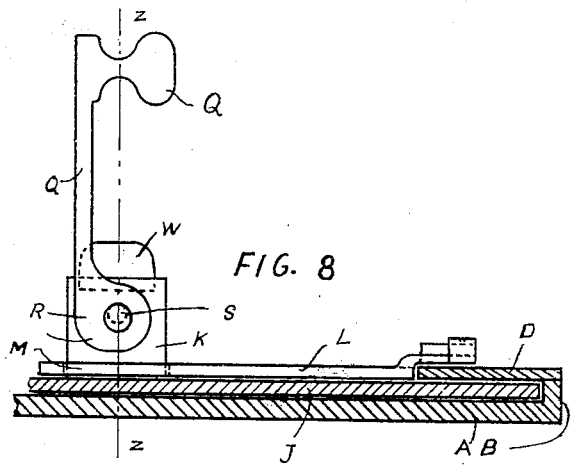
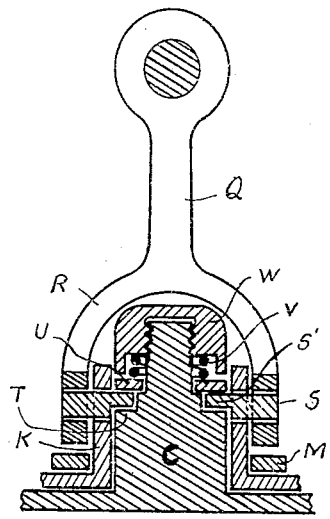
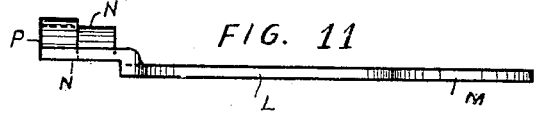
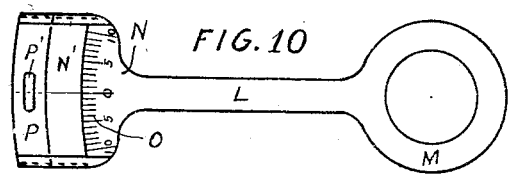
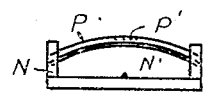
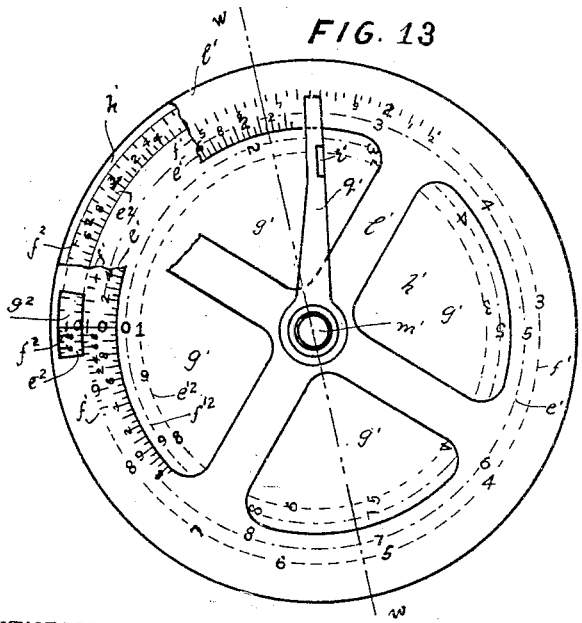
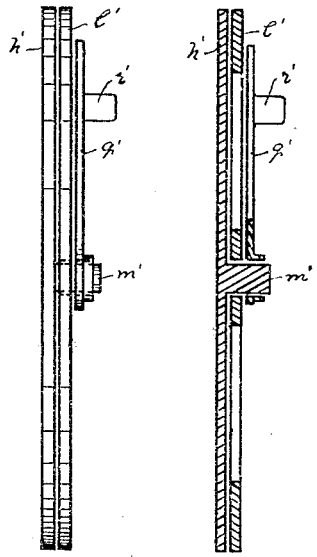

UNITED STATES PATENT OFFICE.

GARABED G. HEGHINIAN, OF NEW YORK, N. Y.

CALCULATING-MACHINE.

1,234,758.    Specification of Letters Patent.    Patented July 31, 1917.

Application filed November 19, 1914. Serial No. 872,905.

*To all whom it may concern:*

Be it known that I, GARABED G. HEGHINIAN, a citizen of the United States, and a resident of New York city, borough of Brooklyn, in the county of Kings and State of New York, have invented certain new and useful Improvements in Calculating-Machines, of which the following is a specification.

This invention relates to certain new and useful improvements in calculating machines based on the principle of the well known slide rule and pertains more particularly to improvements in that class of slide rules known as circular slide rules.

The object of my invention is to provide a new and improved instrument of this kind which is simple in construction, strong, and durable, absolutely reliable, very compact and may at will be used for adding, subtracting, multiplying and dividing.

In the accompanying drawings in which like letters of reference indicate like parts in all the figures:—

Figure 1 is a vertical transverse sectional view of my improved circular slide rule taken on the line $x$—$x$ of Fig. 2.

Fig. 2 is a plan view of my new and improved instrument, parts being broken away.

Fig. 3 is a face view of a modified form of my invention.

Fig. 4 is a transverse sectional view of the same on the lines $y$—$y$ of Fig. 3.

Figs. 5, 6 and 7 are plan views of parts of different constructions of the graduated scale.

Fig. 8 is a vertical transverse sectional view of one half of the instrument with the handle lever raised, also taken on the line $x$—$x$ of Fig. 2.

Fig. 9 is an enlarged transverse sectional view through the central part of the instrument, the handle lever raised, on the line $z$—$z$ of Fig. 8.

Fig. 10 is a plan view of the pointer.

Fig. 11 is a side view of the same.

Fig. 12 is an end view of the same.

Fig. 13 is a plan view of a modified construction of the instrument.

Fig. 14 is a side view of the same.

Fig. 15 is a longitudinal sectional view on the line $w$—$w$ of Fig. 13.

The instrument is constructed with a circular base A having a peripheral upwardly projecting flange B and a central stud C. To the top edge of the flange B an annular horizontal inwardly extending plate D is secured on which two concentric graduated scales E and F are formed, one of these scales being formed along the inner edge of the annular plate D and the other graduated scale along the outer edge adjacent to and concentric with the scale E. The scale E is divided into ten equal parts which are again divided into ten parts and these divisions may be again sub-divided into two parts each or into five, ten, or twenty according to the desired scope of the instrument. The graduations on the scale E begin at zero and end at ten. The other scale F is divided into nine parts of gradually decreasing size and which contain the logarithms beginning at one and ending at one hundred, one thousand, or ten thousand, according to the division required and each sub-division of the scale F is again divided into ten parts, which ten sub-divisions are again divided into ten parts or into twenty and such sub-divisions may again be divided into five, ten or twenty parts each, according to the desired scope of the instrument. The divisions of the two scales E and F begin on the same radial line $D^2$ of the annular plate D. At said radial line I provide an opening G in the plate D in which opening a magnifying glass G' is secured and over said opening a cover H is guided to move radially, the width of which cover H is equal to one-half the width of the opening G in radial direction so that the slide may cover the inner or outer half of said opening according to its adjustment, said cover being provided with a suitable notch H' for shifting it. A circular plate J fitting within the flange B is mounted loosely upon the base A and on the stud C and is provided with a central hub K fitting snugly on the central stud C of the base. The circular plate J is provided on its upper surface with two graduated concentric scales E' and F' which are sub-divided in the same manner and the same proportion as the scales E and F respectively but they are of greater diameter so that these two scales E' and F' will appear under the opening G in the plate D outside of the greater diameter scale F, that is they will be beneath that part of the plate D between the outer circumference of the outer scale F and the inner circumference of the flange B. A pointer L is provided at its inner end with a flat ring M which snugly embraces the central hub K on the disk J and at its outer end it is provided with a forked head N extending over the scales E and F, the segmental edge of which enlargement is provided with a vernier scale O. This forked head is provided with a magnifying glass N′ and a sliding cover P having a notch P′ so that this cover or slide can be adjusted to cover part of the scale E when said cover is in the inner position or part of the scale F when said cover is in outer position. A handle lever Q is provided with a handle knob Q′ at its outer end and at its inner end with a fork R which embraces the hub K. From the shanks of said fork two pivot pins S extend through apertures in the hub K and rest with their inner ends upon an annular shoulder T formed on the stud C. Those parts of the pins S that are within the apertures in the hub K fit snugly in the same and from the inner end of each pivot S an eccentric part S′ projects for a purpose which will be set forth hereinafter. The ends of the shanks of the forked part R are rounded eccentrically at the bottom to form cam edges, so that, as shown in Fig. 8, when the handle lever Q is in vertical position the bottom edges of the forked shanks are above the ring M at the inner end of the indicator L and not in contact therewith. When the handle Q is brought into horizontal position the rounded cam parts of the shanks of the fork R bear downward on the ring M and exert sufficient pressure on the same to lock the indicator L frictionally to the disk or circular plate J and compel said indicator to rotate with the disk whereas when the handle is in vertical position the indicator L can be turned independently of the disk or plate J. When the handle Q is in vertical position the eccentric parts at the inner ends of the pins S bear against a ring U above said parts S′, on which ring U a spring V rests, the upper end of which bears against a head W screwed on the reduced upper threaded end of the stem and by the pressure exerted by said spring V on the ring U and by the ring on the pivot pins, the disk J is pressed friction tight on the base A and is thus held in place. On the other hand when the handle Q is swung down so as to lock the pointer L friction tight on the disk J, said disk is slightly raised off the base so that it can be turned freely.

For the purpose of facilitating the operation the disk J is provided with two additional concentric scales $E^2$ and $F^2$ which correspond respectively to units and logarithms that is to the scales E and E′ and F and F′, which scales $E^2$ and $F^2$ are produced on that part of the disk J between the inner circumferential edge of the plate D and the hub K of the disk J.

The operation is as follows:—

When adding or subtracting numbers, the covers H and P on the plate D and free end of the indicator L are so moved as to expose to view through the opening G and the forked end of the indicator L, the inner scales E and E′.

To add two numbers, say for example, 3 and 5, the handle Q is brought into horizontal position and the subdivision 3 on the scale E′ is brought under the line $D^2$ on the magnifying glass G′; the handle is brought into vertical position thereby locking the plate J to the base and whereby the indicator L is automatically released. Then the hair line on the indicator at the center of the vernier scale O is brought to the subdivision 5 of the scale E; then the handle Q is brought into horizontal position so as to clamp the indicator to the plate J and then the above mentioned center line or hair line on the vernier scale O of the indicator L is brought to zero or ten of the scale E and the result of this addition (8) then becomes visible under the hair line $D^2$ of the glass plate G′, on the scale E′.

To subtract two numbers say 3 from 5, bring the indication 5 of the scale E′ under the hair line $D^2$ of the magnifying glass G′, the handle being in lowered position; then raise the handle and set the indicator so that the central line of the vernier scale O is at the zero of the scale E; then bring the handle into horizontal position and turn until the central line of the vernier scale O is over the 3 of the scale E and the answer (2) will appear under the glass G′ on the scale E′.

The operation for multiplication is the same as for addition only the scales F and F′ are used in place of the scales E and E′.

The operation for division is the same as for subtraction only the scales F and F′ are used in place of the scales E and E′.

Before multiplying or subtracting the slides H and P must be shifted inward so as to cover the scales E′ and E and uncover the scales F′ and F. It is immaterial whether the indicator L and plate J are moved from right to left or left to right as long as the required points are reached. The plate J cannot be shifted while the handle is raised and the indicator cannot be shifted independently while the handle is in horizontal position.

In case a more minute sub-division is desired for the scale, the scale may be arranged as shown in Fig. 5 in which each main sub-division is divided into ten parts by the lines a and each of these tenths may be again divided into five parts by the stepped lines b. In case the subdivisions indicated by the lines c in Fig. 6 are to be divided into ten parts, they are first divided into halves by the line d. Each of these halves is again divided into five parts by the stepped lines $e$. In cases the sub-division shown at $f$ in Fig. 7 is to be divided into twenty parts, they are first divided by a central line $g$. The spaces thus obtained are divided into five parts each by the stepped lines $h$ and each of the smaller sub-divisions thus obtained are halved, that is converted into twentieths by short lines $k$. In Figs. 5, 6 and 7 these minor sub-divisions are all stepped and produced on a series of concentric lines $m$. For example if the scale E shown in Fig. 1 represents two hundred units as each part is divided into twenty, the scale shown in Fig. 5 would be divided into one thousand units for the entire scale. According to Fig. 6 the entire scale would be divided into two thousand parts. According to Fig. 7 the entire scale would be divided into four thousand parts. Of course these sub-divisions may be carried on still further according to the size of the instrument. In the construction shown in Figs. 3 and 4 the plate J is provided with a dove tail track $n$ and with a projecting handle $o$ and in this dove tail track $n$ a dove tail carriage $p$ slides friction tight and part of it extends over the scales E and F on the plate D and represents the indicator. $s$ is a handle for holding the device.

In the construction shown in Figs. 13, 14 and 15 I have two superimposed disks $h'$ and $l'$, the former having a central stud $m'$ which passes through a central aperture of the disk $l'$. A pointer $q'$ is mounted friction tight on the stud $m'$ and is provided with a handle projection $r'$. Two scales $e'$ and $f'$ are formed on the upper disk or plate $l'$ which has four segmental openings $g'$, said scales being concentric and arranged in the same manner as the scales E and F on the plate D of the construction shown in Figs. 1 and 2. The lower disk $h'$ is provided with two scales $e^2$ and $f^2$ which are concentric and are arranged the same as the scales E' and F' of the construction shown in Figs. 1 and 2. The upper disk $l'$ is provided with an opening $g^2$ having a hair line in radial alinement with the zero or ten of the scale $e'$ on said disk or plate $l'$. On the outer face of the plate $h'$ two scales $e^{12}$ and $f^{12}$ are produced to correspond with the supplemental scales of the construction shown in Figs. 1 and 3.

Having described my invention what I claim as new and desire to secure by Letters Patent is:—

1. In a calculating machine, the combination with a circular base plate provided with an upwardly extending rim flange, of an annular plate secured on the rim flange to extend inwardly, scales on said annular plate, a disk mounted on the base plate and provided with scales, a central stud on the base plate, a central hub on the disk resting on the base plate, a pointer extending from the hub over the annular plate and a handle pivoted to the hub and means on said handle for engaging the loosely mounted pointer frictionally with the disk provided with the hub, substantially as set forth.

2. In a calculating machine, the combination with a circular base plate provided with an upwardly extending rim flange, of an annular plate secured to the rim flange to project inwardly, scales on said annular plate, a disk mounted on the plate and provided with scales, a central stud on the base plate, a central hub on the disk resting on the base plate, a pointer extending from the hub over the annular plate and a handle pivoted to the hub and a cam formed on the inner end of the pivoted handle to engage the inner end of the pointer, substantially as set forth.

3. In a calculating machine, the combination with a circular base plate provided with an upwardly extending rim flange, of an annular plate secured to the rim flange to extend inwardly and provided with scales, a disk mounted on the base plate and provided with scales, a central stud on the base plate, a central hub on the disk resting on the base plate, a pointer extending from the hub over the annular plate, a handle pivoted to the hub and means on the handle for frictionally engaging the pointer with the disk provided with the hub and for frictionally engaging said disk with the base plate, substantially as set forth.

4. In a calculating machine, the combination with a circular base plate provided with an upwardly extending rim flange, of an annular plate secured to the rim flange and extending inwardly, scales on said annular plate, a disk mounted on the plate provided with scales, a central stud on the base plate, a central hub on the disk resting on the base plate, a loose indicator extending from the hub over the annular graduated plate, a handle pivoted to the hub, means on the handle for frictionally engaging the indicator with the disk provided with the hub and for frictionally engaging said disk with the base and means on the pivoted end of said handle for lifting the disk with the hub off the base when locking the indicator to said disk, substantially as set forth.

5. In a calculating machine, the combination with a base plate having a stud, of a plate mounted loosely on the base plate and having a hub surrounding the stud, a graduated annular plate secured to the base plate and extending over the rim part of the plate mounted loosely on the base, an indicator mounted loosely on the hub and resting on the said plate, a handle pivoted on the hub and having its lower end forked and the outer edge of each shank shaped as a cam, and which can bear upon the indicator mounted loosely on the base plate and which also serves for turning the hub, substantially as set forth.

6. In a calculating machine, the combination with a base plate having a stud, of a plate mounted loosely on the base plate and having a hub surrounding the stud, a graduated annular plate secured to the base and extending over the rim part of the plate mounted loosely on the base, an indicator mounted loosely on the hub and resting on the said plate, a handle lever, pivots projecting from the handle through openings in the hub and engaging said stud, substantially as set forth.

7. In a calculating machine, the combination with a base plate having a stud, of a plate mounted loosely on the base plate and having a hub surrounding the stud, a graduated annular plate secured to the base plate and extending over the rim part of the plate mounted loosely on the base, an indicator mounted loosely on the hub and resting on the said plate, a handle lever, cylindrical pivots projecting from the inner end of the handle lever and passing through holes in the hub, which holes are concentric with the said pivots, an eccentric part of the pivot projecting beyond the inner surface of the hub to engage a shoulder of the stud, substantially as set forth.

8. In a calculating machine, the combination with a base plate having a stud, of a plate mounted loosely on the base plate and having a hub surrounding the stud, a graduated annular plate secured to the base plate and extending over the rim part of the plate mounted loosely on the base, an indicator mounted loosely on the hub and resting on the said plate, a handle lever, cylindrical pivots projecting from the inner end of the handle lever and passing through holes in the hub, which holes are concentric with the said pivots, an eccentric part of the pivot projecting beyond the inner surface of the hub to engage a shoulder of the stud, a ring in the upper part of the hub and surrounding the stud, a yielding means for pressing said ring upon those parts of the pivots projecting beyond the inner cylindrical surface of the hub, substantially as set forth.

9. In a calculating machine, the combination with a base plate having a stud, of a plate mounted loosely on the base plate and having a hub surrounding the stud, a graduated annular plate secured to the base plate and extending over the rim part of the plate mounted loosely on the base, an indicator mounted loosely on the hub and resting on the said plate, a handle lever, cylindrical pivots projecting from the inner end of the handle lever and passing through holes in the hub, which holes are concentric with the said pivots, an eccentric part of the pivot projecting beyond the inner surface of the hub to engage a shoulder of the stud, a ring within the upper end of the hub and resting upon those parts of the pivots projecting beyond the inner surface of the hub, a spring resting on said ring and surrounding the upper part of the stud and a spring retaining cap screwed upon the upper part of the stud, substantially as set forth.

Signed at New York city, in the county of New York and State of New York this 6th day of January A. D. 1914.

GARABED G. HEGHINIAN.

Witnesses:
   M. SHAW,
   PAUL H. FRANKE.

Copies of this patent may be obtained for five cents each, by addressing the "Commissioner of Patents, Washington, D. C."